US008553628B2

(12) United States Patent
Jin et al.

(10) Patent No.: US 8,553,628 B2
(45) Date of Patent: Oct. 8, 2013

(54) SCHEDULING METHOD AND APPARATUS FOR SPATIAL REUSE

(75) Inventors: Sung-Geun Jin, Daejeon (KR); Jin Kyeong Kim, Daejeon (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 437 days.

(21) Appl. No.: 12/814,392

(22) Filed: Jun. 11, 2010

(65) Prior Publication Data

US 2010/0316013 A1 Dec. 16, 2010

(30) Foreign Application Priority Data

| Jun. 11, 2009 | (KR) | 10-2009-0051975 |
| Aug. 26, 2009 | (KR) | 10-2009-0079318 |
| Feb. 5, 2010 | (KR) | 10-2010-0011164 |
| Feb. 23, 2010 | (KR) | 10-2010-0015960 |
| Jun. 11, 2010 | (KR) | 10-2010-0055206 |

(51) Int. Cl.
*H04W 74/00* (2009.01)
*H04W 74/04* (2009.01)

(52) U.S. Cl.
USPC ............................ 370/329; 370/330; 370/336

(58) Field of Classification Search
None
See application file for complete search history.

(56) References Cited

U.S. PATENT DOCUMENTS

| 6,580,704 | B1 * | 6/2003 | Wellig et al. ................... 370/338 |
| 7,545,771 | B2 * | 6/2009 | Wentink et al. ................ 370/329 |
| 7,609,674 | B2 | 10/2009 | Kwon et al. |
| 7,640,022 | B2 * | 12/2009 | Salokannel et al. ......... 455/452.2 |
| 8,238,313 | B2 * | 8/2012 | Maltsev et al. ................ 370/337 |
| 2003/0214914 | A1 * | 11/2003 | Cain ............................. 370/252 |
| 2008/0144493 | A1 * | 6/2008 | Yeh ................................ 370/230 |
| 2008/0297413 | A1 * | 12/2008 | Kokku et al. .................. 342/367 |
| 2010/0061347 | A1 * | 3/2010 | Bracha ........................... 370/336 |

* cited by examiner

*Primary Examiner* — Robert Scheibel

(57) ABSTRACT

A scheduling method of giving a chance for transmission to a plurality of terminals in the same time period, and a device therefor are provided. The scheduling method includes: transmitting first scheduling information to terminals in a network, the first scheduling information defining transmitting/receiving terminals and a transmission time period; receiving channel measurement information including inter-terminal interference information from the terminals in the network; and generating second scheduling information defining transmission time periods and a plurality of transmitting/receiving terminals that do not interfere with each other by using the channel measurement information.

25 Claims, 22 Drawing Sheets

FIG.9

| Element ID | Length | Monitored Channel Status |
|---|---|---|

| Octets: | 1 | 1 | 1 |
|---|---|---|---|

FIG.19

| TID | SPType | Source AID | Destination AID | SP Duration | reverse direction | Res. |

FIG.20

| Traffic type | TSID | Pseudo-static | Truncate | Extendable | UP | Dynamic ACK Policy |
|---|---|---|---|---|---|---|
| ACK Policy | Destination STA | | | | | |

SCHEDULING METHOD AND APPARATUS FOR SPATIAL REUSE

CROSS-REFERENCE TO RELATED APPLICATION

This application claims priority to and the benefit of Korean Patent Application Nos. 10-2009-0051975, 10-2009-0079318, 10-2010-0011164, 10-2010-0015960, and 10-2010-0055206, filed in the Korean Intellectual Property Office on Jun. 11, 2009, Aug. 26, 2009, Feb. 5, 2010, Feb. 23, 2010, and Jun. 11, 2010, the entire contents of which are incorporated herein by reference.

BACKGROUND OF THE INVENTION (a) Field of the Invention

The present invention relate to a method and apparatus for scheduling data transmission of terminals in WLAN and WPAN environments.

(b) Description of the Related Art

In a wireless communication system such as WLAN (wireless local area network) or WPAN (wireless personal area network), a control station such as an AP (access point) or a PNC (piconet cordinator) allocates a chance for transmission to terminals according to a predetermined policy in a predetermined time period so as to enable the terminals to transmit data without depending on a competitive way.

For example, an AP of WLAN classifies time periods into competitive periods and noncompetitive periods and gives an exclusive chance for transmission to a specific terminal in a noncompetitive period by using a polling method. That is, if the AP occupies a channel with the highest priority for resource allocation and transmits a polling message to terminals, a terminal selected in advance starts to transmit data immediately upon receiving the polling message.

In such a general resource allocation method, during one chance for transmission, one terminal is exclusively given a chance for transmission. However, since a terminal having a highly-directional transmission capacity or reception capacity forms a narrow beam, even when the terminal is transmitting or receiving data, other terminals that are not in the zone of the beam can perform data transmission/reception without interfere with each other.

Nevertheless, since a wireless communication system according to the related art gives a chance for transmission to only one terminal pair in the same time period during resource allocation based on a noncompetitive method, it is not utilizing a merit of a terminal having a highly-directional transmission/reception capacity as it should.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a scheduling method and apparatus having advantages of giving a chance for transmission to a plurality of terminals in the same time period.

An exemplary embodiment of the present invention provides a scheduling method of a control station including: transmitting first scheduling information to terminals in a network, the first scheduling information defining transmitting/receiving terminals and a transmission time period; receiving channel measurement information including inter-terminal interference information from the terminals in the network; and generating second scheduling information defining transmission time periods and a plurality of transmitting/receiving terminals that do not interfere with each other by using the channel measurement information.

Another exemplary embodiment of the present invention provides a terminal device including: a channel measuring unit configured to measure a transmission channel of a transmission terminal and a reception terminal when the terminal device is not defined as the transmission terminal or the reception terminal in scheduling information received from a control station; and an information transmitting unit configured to transmit channel measurement information according to the measurement results to the control station, and to perform data transmission or ACK message transmission in a transmission time period defined in the scheduling information when the terminal device is defined as the transmission terminal or the reception terminal in the scheduling information.

According to the exemplary embodiments of the present invention, it is possible to give a chance for transmission to a plurality of terminal pairs in the same time period in a non-competitive transmission period, thereby improving the efficiency of data transmission.

BRIEF DESCRIPTION OF THE DRAWINGS

FIG. 9 is a drawing illustrating an example of a result report message;

FIG. 19 is a drawing illustrating an example of a field structure of scheduling information used in the scheduling method of FIG. 17 and FIG. 18;

FIG. 20 is a drawing illustrating the structure of information used to determine the characteristics of traffic for frame transmission;

DETAILED DESCRIPTION OF THE EMBODIMENTS

Figure 1:
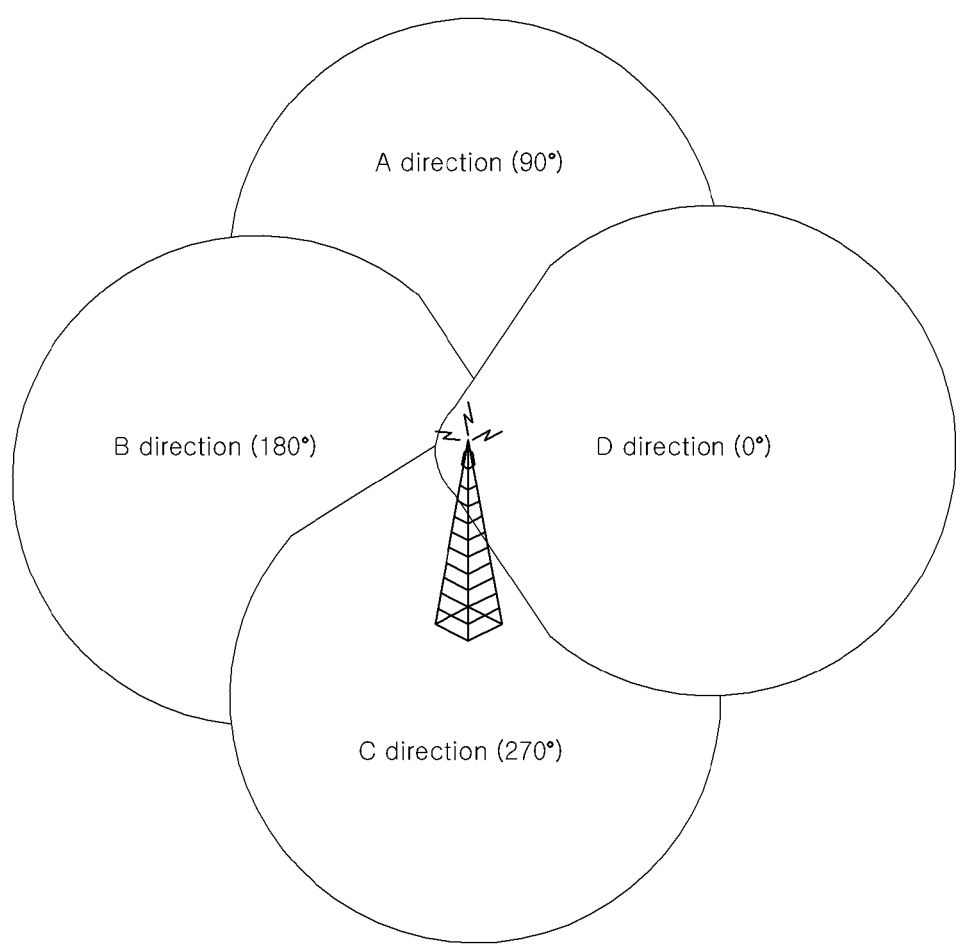
FIG. 1 is a drawing illustrating an exemplary embodiment of a transmission-beam forming method to supplement or substitute for omni-directional transmission.

In general, a communication system includes a transmitter and a receiver. The transmitter and the receiver are a transceiver that simultaneously perform a transmission function and a reception function, and are implemented in forms of user equipment and a control station in a mobile communication system. For ease of explanation, in the present invention, a terminal that transmits user data in a mobile communication system is referred to as a transmission terminal, another terminal that receives user data from a transmission terminal is referred to as a reception terminal, and an agent that controls data transmission of a transmission terminal and a reception terminal is referred to as a control station.

The control station can be called a base station (BS), an advanced base station (ABS), an access point (AP), a piconet coordinator (PNC), etc., and is a generic term for apparatuses taking a role of scheduling data transmission times for terminals in a network. The terminal can be called a mobile station (MS), an advanced mobile station (AMS), user equipment (UE), etc.

If a transmission beam zone of any one terminal pair of terminals having highly-directional transmitting/receiving capacities does not overlap a transmission beam zone of another terminal pair, even though the two terminal pairs are close to each other, they can independently perform data transmission.

The present invention is based on this characteristic and proposes a scheduling method and device for giving a chance for transmission to a plurality of terminals in a noncompetitive transmission period. Since a plurality of terminals are given a chance for transmission in the same transmission period, scheduling according to exemplary embodiments of the present invention is called scheduling for spatial reuse.

Hereinafter, for ease of explanation, a scheduling method and device in a WLAN environment will be frequently described. However, this is just one of various exemplary embodiment of the present invention. The present invention is applicable to any kinds of wireless communication systems that support noncompetitive scheduling, for example, WPAN (wireless personal area network).

In the specification, the term 'a terminal in a network' means a terminal that is in a cell including a control station and is substationally controlled by the control station, and a cell influenced by a control station is also referred to as a serving cell or effective cell.

In the specification, the term 'scheduling information' is a generic term for data including various kinds of information necessary for allowing data transmission of a specific terminal in a noncompetitive transmission period, and may include a polling message of WLAN or a scheduling message of WPAN as specific examples.

Exemplary embodiments of the present invention will be described below in detail with reference to accompanying drawings.

Transmission-Beam Forming Method of Control Station

In order to enable a control station in a wireless communication system capable of high-directional data transmission to effectively transmit scheduling information to terminals in a network, it is necessary to find an additional transmission method to supplement an omni-directional transmission method.

For example, in a high frequency band such as a transmission band of 60 GHz, since a distance by which data can be transmitted by omni-directional transmission is short, it is difficult to sufficiently transmit scheduling information to all terminals in a network. For this reason, it is necessary to use a basic omni-directional transmission and an additional transmission method to supplement the omni-directional transmission or to use a separate transmission method without using the omni-directional transmission.

FIG. 1 is a drawing illustrating an exemplary embodiment of a transmission-beam forming method to supplement or substitute for omni-directional transmission.

As seen from FIG. 1, a control station can omni-directionally transmit the same scheduling information by using directional antennas having a beam width of 90 degrees. Terminals in a network can receive the same scheduling information form the control station through transmission beams formed as shown in FIG. 1 no matter which directions the terminals are in.

Figure 2:
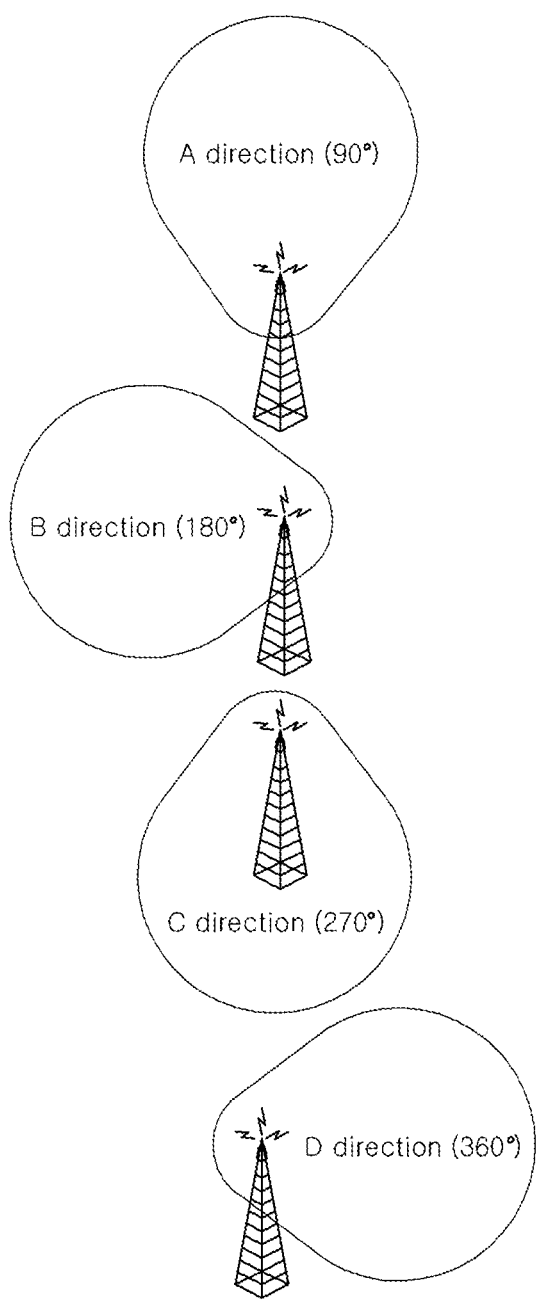
FIG. 2 and FIG. 3 are drawings illustrating other exemplary embodiments of the transmission-beam forming method to supplement or substitute for omni-directional transmission.
Figure 3:
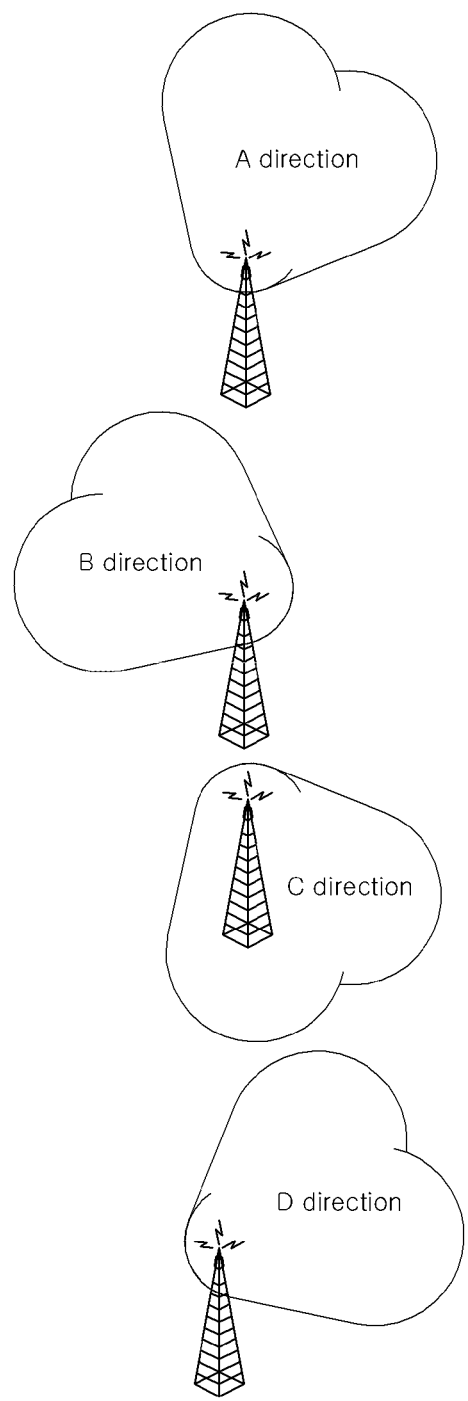

FIG. 2 and FIG. 3 are drawings illustrating other exemplary embodiments of the transmission-beam forming method to supplement or substitute for omni-directional transmission.

The control station may omni-directionally transmit data by using a highly-directional antenna whose direction can be controlled. Alternatively, the control station may omni-directionally transmit data by using a plurality of independent highly-directional antennas. FIG. 2 is a drawing illustrating an example of a transmission-beam forming method of sequentially transmitting scheduling information in all directions with a plurality of directional antennas having a beam width of 90°, and FIG. 3 is a drawing illustrating an example of a transmission-beam forming method of transmitting scheduling information by using a multi-beam.

The examples of beam widths shown in FIG. 1, FIG. 2, and FIG. 3 are illustrative only. The direction of a beam width or the number of main lobes of a multi-beam is not limited to the shown examples. Also, a transmission beam should not be formed in a two-dimensional plane as shown in FIGS. 1 to 3, but may be formed in three-dimensional space upon the same principle.

Basic Operations of Control Station and Terminal

Figure 4:
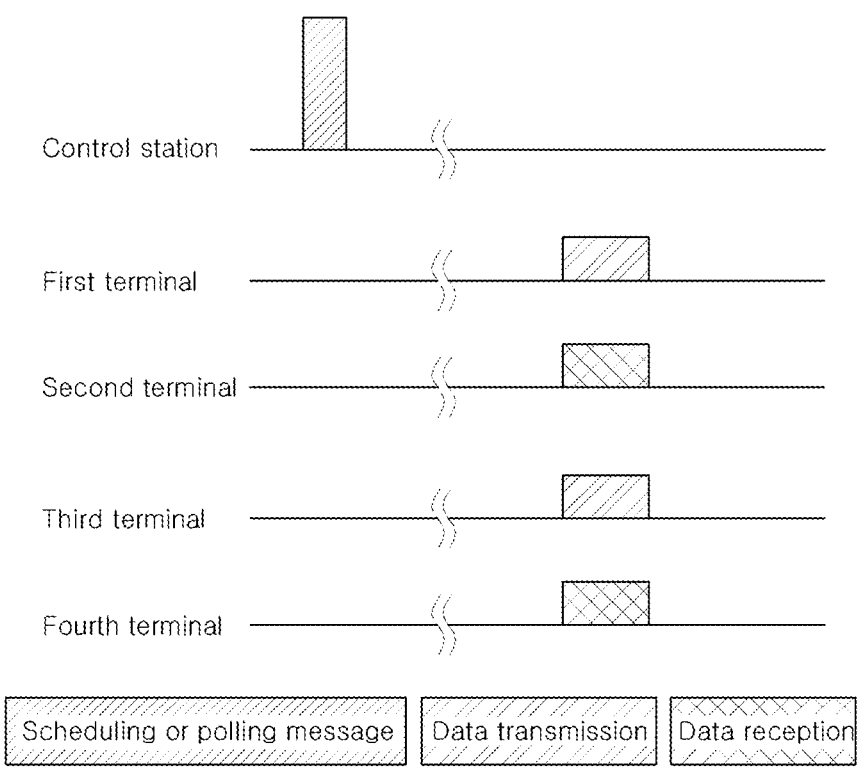
FIG. 4 is a drawing illustrating a basic operaion of a scheduling method according to an exemplary embodiment of the present invention.

For understanding of the present invention, first, a scheduling operation of the control station and data transmission operations of terminals are schematically examined. FIG. 4 is a drawing illustrating a basic operaion of a scheduling method according to an exemplary embodiment of the present invention.

If the control station omni-directionally transmits scheduling information by using the above-mentioned transmission-beam forming method, each of terminals analyzes the received scheduling information to determine whether a service period for data transmission has been allocated to the corresponding terminal.

FIG. 4 shows a specific example in which the same service period has been allocated to two terminal pairs. In FIG. 4, on the basis of the scheduling information of the control station, a terminal pair composed of a first terminal and a second terminal and another terminal pair composed of a third terminal and a fourth terminal can simultaneouly perform data transmission in the same time period without interfering with each other. The terminals may start data transmission immediately after receiving the scheduling information, or may perform data transmission in a specific time period defined in the scheduling information, or may perform data transmission in an arbitrary time section of an allocated time period.

Figure 5:
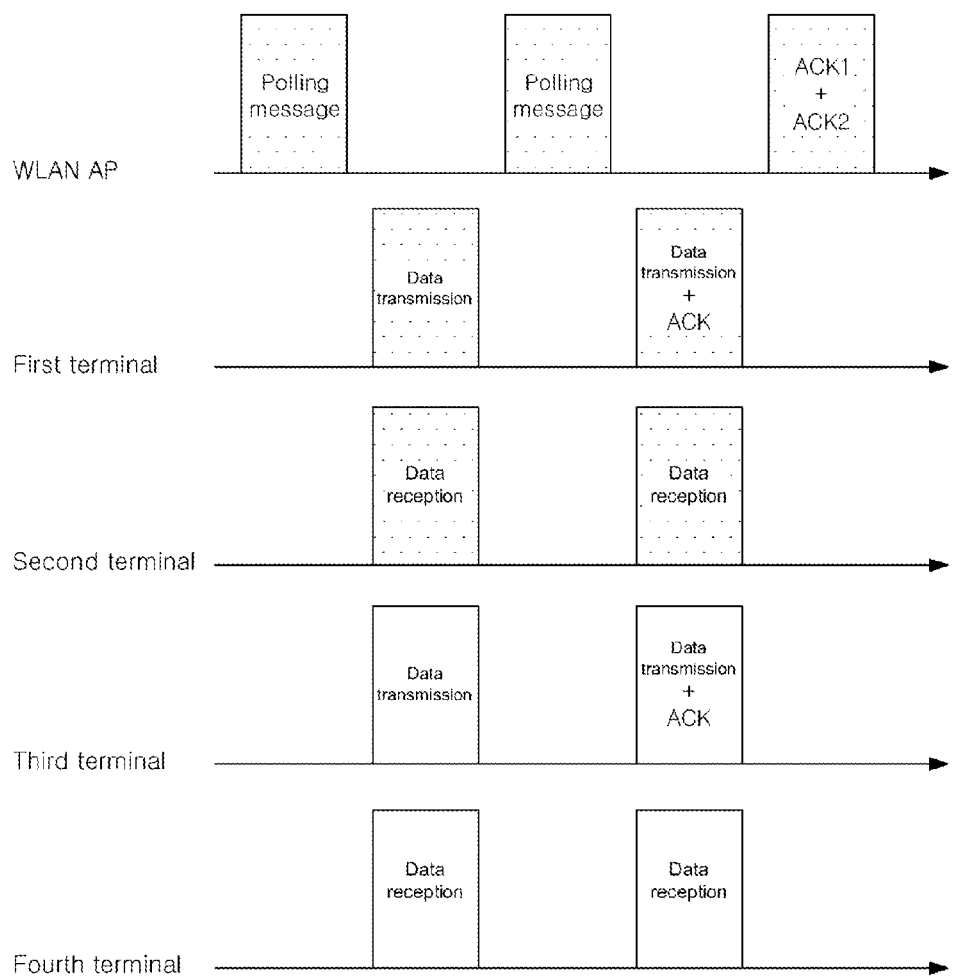
FIG. 5 and FIG. 6 are drawings illustrating more specific examples of a scheduling operation of an AP and data transmission operations of terminals in WLAN.
Figure 6:
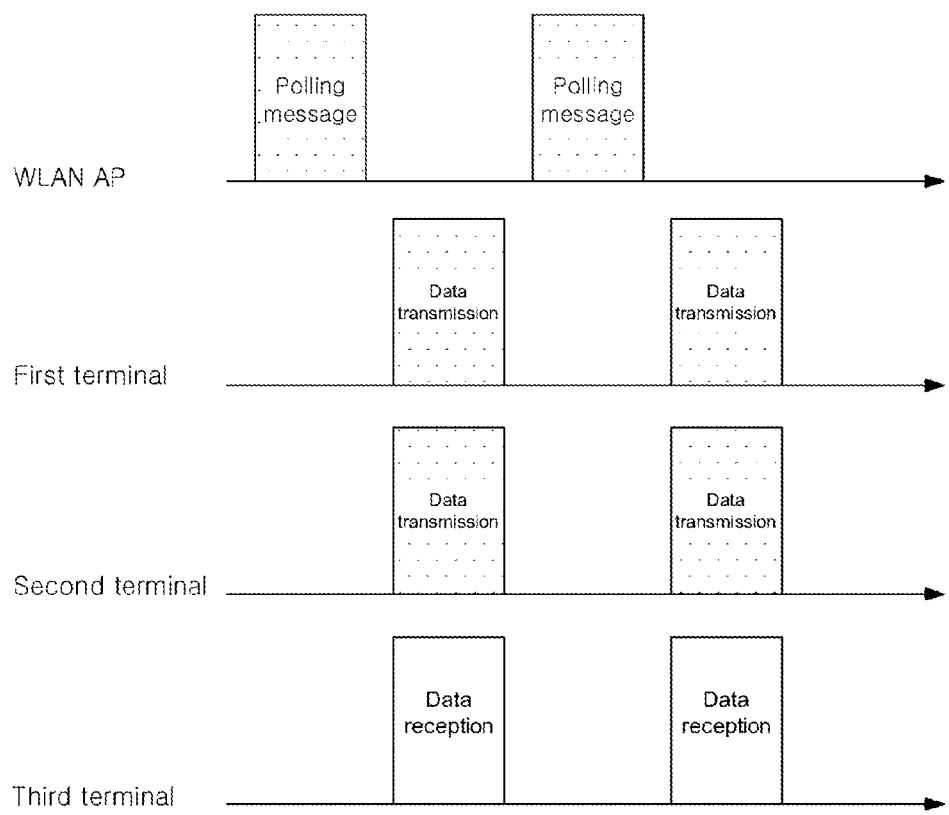

FIG. 5 and FIG. 6 are drawings illustrating more specific examples of a scheduling operation of an AP and data transmission operations of terminals in WLAN.

As shown in FIG. 5, if the AP transmits a polling message to terminals in the network, a chance for transmission is allocated to a first terminal and a third terminal of the terminals receiving the polling message, the first terminal and the third terminal being defined in the polling message. The first terminal and the third terminal transmit data to the second terminal and the fourth terminal in a time period allocated by the AP, respectively. If data reception is completed, the second terminal and the fourth terminal transmit messages (e.g., ACK messages) to the first terminal and the third terminal to inform completion of normal reception of data. The second terminal and the fourth terminal may transmit the ACK messages to the AP in addition to the first terminal and the third terminal to inform completion of data transmission. Alternatively, the ACK messages may be transmitted to the AP by the first terminal and the third terminal.

Also, as shown in FIG. 6, the AP may transmit a polling message to define two transmission terminals and one reception terminal. In this case, if the AP transmits the polling message to the terminals in the network, a chance for transmission is allocated to a first terminal and a second terminal of the terminals receiving the polling message, the first terminal and the second terminal being defined in the polling message. The first terminal and the second terminal simultaneously transmit data to the third terminal in a time period allocated by the AP. Therefore, the data reception rate of the third terminal is twice as compared to a reception terminal shown in FIG. 5. Although not shown, if the data reception is completed, the third terminal may transmit an ACK message to the first terminal and the second terminal to inform completion of normal reception of the data. The third terminal may transmit the ACK message to the AP in addition to the first terminal and the second terminal. Alternatively, the ACK message may be transmitted to the AP by the first terminal and the second terminal.

Figure 7:
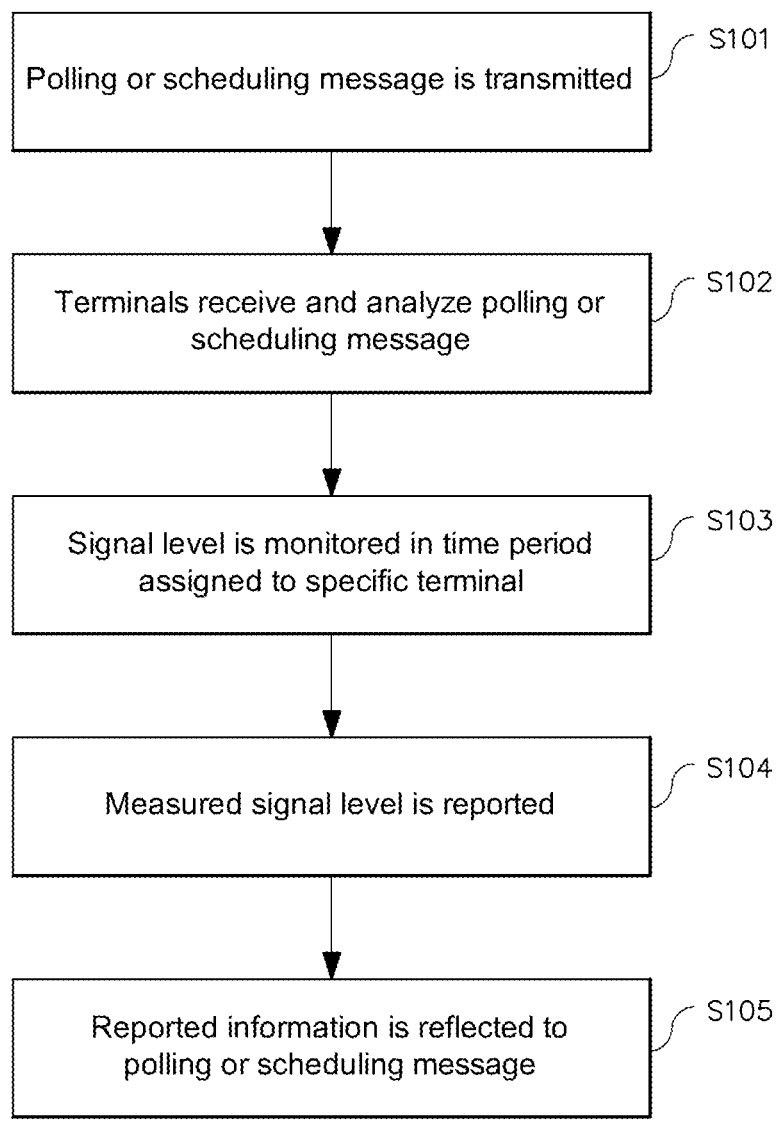
FIG. 7 is a flowchart illustrating sequential steps of a scheduling operation of the control station.

A scheduling operation of the control station will be described below in detail. FIG. 7 is a flowchart illustrating sequential steps of a scheduling operation of the control station.

The control station transmits scheduling information to the terminals in the network, the scheduling information defining one terminal to have transmission authority in a specific time period control (S101). The scheduling information includes information on the first terminal to have transmission authority and the second terminal to receive data from the first terminal. As such terminal information, a terminal identification means such as a MAC address or a FIN (flow identity number) may be used.

Each of the terminals analyzes the received scheduling information to determine whether the corresponding terminal has data transmission authority or is a destination of data transmission (S102).

Since the scheduling information can be received and analyzed by not only the terminals participating in the data transmission/reception but also the other terminals, a terminal that requires participating in data transmission/reception next time measures a channel in the specific time period (S103), and informs the control station of a measured signal level (or energy level) value and identification information on the terminal(s) having participated in the data reception in the specific time period (S104).

The control station reflects the informed information when generating next scheduling information (S105). Specifically, when it is determined from the received information (channel measurement information) that the signal level value in the specific time period is enough low that data reception is possible and it is perceived that there is another terminal who plans data transmission to the informant terminal, the control station generates the next scheduling information to allow a terminal pair of informant terminal and another terminal to perform data transmission in a specific time period. Even though the signal level value is equal to or greater than a reference value, if there is a terminal requiring data transmission, the control station may generate the next scheduling information to allow the corresponding terminal to perform data transmission.

Since Steps S101 to S105 are repeatedly performed, it is possible to simultaneously permit a plurality of terminal pairs a chance for transmission in a specific time period.

The individual steps of FIG. 7 are generally classified into a stage for collecting channel measurement information and a stage for generating scheduling information, which will be described below in detail.

Stage for Collecting Channel Measurement Information (Preprocessing Stage of Scheduling)

Before resources are allocated to the plurality o terminals, it should be first checked whether interference will occur when terminals having a chance for transmission transmit data. To this end, the control station collects predetermined channel measurement information from the terminals in the network and uses the collected channel measurement information to determine whether interference will occur.

In other words, if the terminals perform channel measurement in a time period when data transmission is performed and transmit the channel measurement information to the control station, the control station uses the received channel measurement information as basic data for the next resource (time period) allocation. For example, in order to collect the channel measurement information, the control station allocates a time period for test message transmission to the second terminal while requesting the first terminal to perform channel measurement. The first terminal performs channel measurement and transmits the channel measurement information to the control station while the second terminal transmits the test message.

If it is assumed that the channel measurement information includes information on channel's energy level, the measured channel's energy level that is equal to or lower than a predetermined threshold value means that, even when the first terminal receives data from the third terminal while the second terminal transmits data, interference does not occur.

However, requesting channel measurement does not necessarily need test message transmission. If a terminal to perform channel measurement can perceive data transmission of other terminals, channel measurement is possible without using a separate test message. Also, the channel measurement of the terminal should not be necessarily performed by a request of the control station but may be performed periodically or when a predetermined event occurs.

A procedure of collecting the channel measurement information will be described below in detail by using a specific example.

All terminals in the network have the scheduling information (or channel allocation information) supplied form the control station. A terminal can see which time periods the other terminals can transmit data in since the scheduling information includes not only information on a channel section allocated to the corresponding terminal but also information on channel sections allocated to the other terminals. The terminals collect channel measurement information on the basis of the scheduling information.

Figure 8:
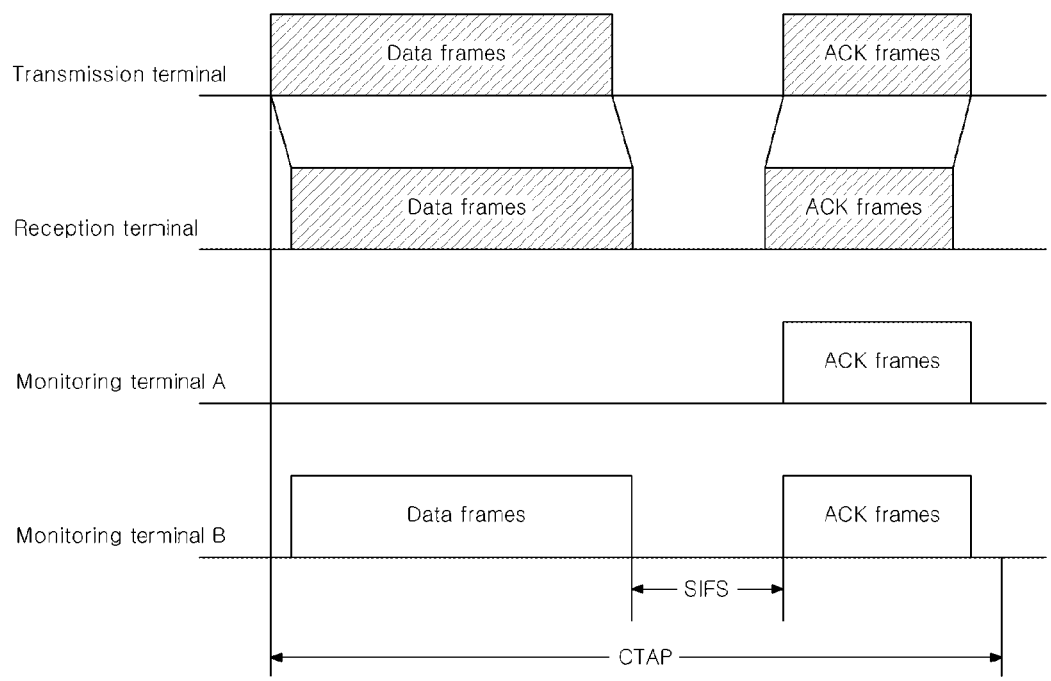
FIG. 8 is a drawing illustrating a specific example of a procedure of collecting channel measurement information of a terminal.

FIG. 8 is a drawing illustrating a specific example of a procedure of collecting channel measurement information of a terminal.

In FIG. 8, a monitoring device 'A' and a monitoring device 'B' perform channel measurement in a time period when a source device transmits data to a destination device.

In the example of FIG. 8, the monitoring device 'A' cannot monitor data frame transmission of the source device but the monitoring device 'B' can monitor data frame transmission of the source device. In contrast with this, the monitoring device 'A' and the monitoring device 'B' can monitor ACK frame transmission of the destination device. An interval between a period when the monitoring device 'B' monitors data frames and a period when the monitoring device 'B' monitors ACK frames is referred to as a shot interframe space (SIFS). Transmitting and monitoring of the data frames and the ACK frames are performed during one channel time allocation (CTA) period.

The monitoring device 'A' and the monitoring device 'B' transmit monitored information to the control station. In the example of FIG. 8, the channel measurement information includes the monitored information and may be included in a specific result report message and then transmitted to the control station.

FIG. 9 is a drawing illustrating a PSMP-DLT measurement element as an example of a result report message. The arrangement of individual fields constituting the PSMP-DLT measurement element or the number of bits allocated to each of the fields may be variously modified. An example of channel measurement information reported through the PSMP-DLT measurement element is shown in Table 1.

TABLE 1

| Status index | Source device (by source) | Destination device (by destination) |
|---|---|---|
| y1 | Decode | Decode |
| y2 | Decode | Busy |
| y3 | Decode | Idle |
| y4 | Busy | Decode |
| y5 | Idle | Decode |
| y6 | Idle | Idle |
| y7 | unknown | unknown |

In Table 1, y1 to y7 are constant numbers that can be arbitrarily defined, and any kinds of information, including the contents defined in Table 1, necessary for channel measurement result report may be defined as the contents of the status index. Further, in Table 1, the term 'by src' represents a channel status when the source device performs data transmission and the term 'by dest' represents a channel status when the destination device performs data transmission.

In Table 1, the status index represents a channel status as any one of 'Decode', 'Busy', 'Idle', and 'Unknown' for source device and destination device.

The term 'Decode' represents that a monitoring terminal can successively receive frames transmitted by a transmission terminal with no errors.

The term 'Idle' represents that a monitored channel is idle in a channel measurement period.

The term 'Busy' represents that, assuming that a measurement period had been allocated to only a terminal pair, while a monitoring terminal is busy, decoding of frames has failed in the measurement period. In other words, the term 'Busy' represents that, while the monitored channel has been busy, normal reception of frames has failed in the measurement period. The term 'Busy' may represent that an error has occurred during frame reception or that the channel is busy regardless of whether an error has occurred.

The term 'Unknown' represents that, while the monitored channel is busy, it cannot be seen whether the monitored channel is being used by the source device or the destination device.

Table 1 shows an exemplary embodiment of the channel measurement information. Another exemplary embodiment of the channel measurement information may include a signal-to-noise ratio (SNR) or received signal strength indication (RSI) instead of the above-mentioned channel status, or may further include at least one of the SNR and the RSI in addition to the above-mentioned channel status.

Stage of Generating Scheduling Information (Scheduling Stage)

The control station uses the channel measurement information collected form the terminals to generate scheduling information for spatial reuse.

Figure 10:
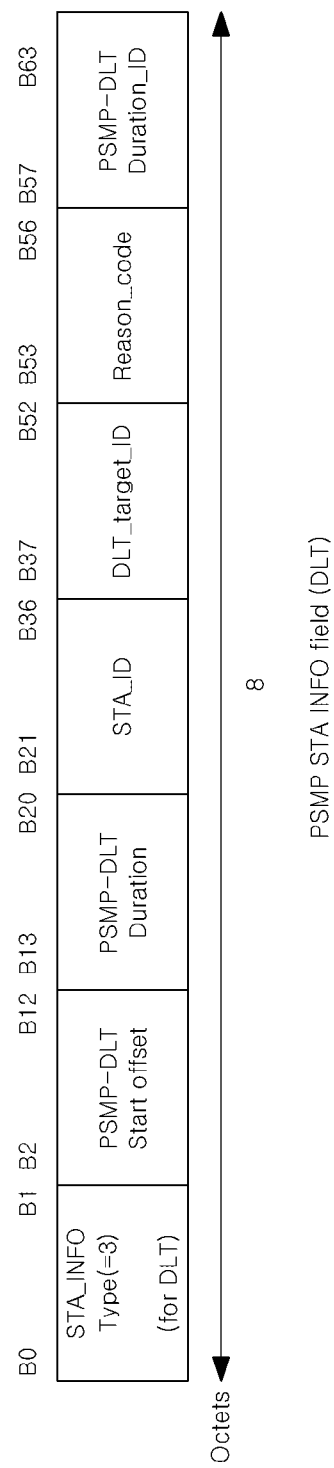
FIG. 10 is a drawing illustrating an example of scheduling information.

FIG. 10 is a drawing illustrating an example of scheduling information. Specifically, FIG. 10 shows an example of a polling message used in a power save multi-poll (PSMP) scheme of IEEE 802.11 WLAN. However, this is just an example. The arrangement of individual fields constituting the scheduling information or the number of bits allocated to each of the fields may be variously modified.

PSMP-DLT (Power Save Multi-Poll Direct Link Transmission) Start Offset field indicates the start of the PSMP-DLT. The offset is specified relative to the end of the PSMP frame. The first PSMP-DLT is scheduled to begin from the end of the last PSMP-DTT or PSMP-UTT described in the PSMP after a SIFS period ends.

The PSMP-DLT Duration field indicates the maximum length of a PSMP-DLT for a terminal pair composed of a transmission terminal and a reception terminal (or station pair). All transmissions by the transmission terminal within the current PSMP sequence lie within the indicated contents in the PSMP-DLT.

The DLT_target_ID field contains the AID (Association ID) of the reception terminal to which the transmission terminal tries to send frames when PSMP-DLT is used for individually addressed data transmission. The DLT_target_ID field contains the unique ID assigned by the control station when PSMP-DLT is used for group addressed data transmission. In this case, the control station issues the unique ID representing multicast/broadcast address when DLS Setup procedure is processed.

The 4-bit reason code field indicates what purpose this PSMP-DLT is allocated for. It is defined in Table 2.

TABLE 2

| Reason code | Meaning |
|---|---|
| x0 | frame transmission |
| x1 | measurement of Pilot frame transmission |
| x2 | reporting of channel status information |
| x3 | Data transmission by spacial reuse |
| x4-x15 | Reserved |

In Table 2, x0 to x15 are constant numbers that can be arbitrarily defined, and any kinds of information, including the contents defined in Table 2, necessary for resource allocation may be defined as the contents of the reason code.

In Table 2, the measurement of pilot frame transmission is used for other monitoring terminals to measure the channel status when the transmission terminal transmits a pilot frame for measurement to the reception terminal.

When the reason code is set to x2, a terminal transmits channel status report information (or channel measurement information) without depending on a PSMP operation.

PSMP-DLT Duration ID represents the time period composed of PSMP-DLT Start Offset and PSMP-DLT Duration. This value is used to indicate measured time period when a monitoring terminal reports the channel status information to the control station.

Next, a scheduling procedure of a PSMP operation of WLAN will be described below briefly.

A PSMP-DLT is allocated for a terminal pair composed of two terminals, one of which is scheduled to transmit frames, and the other is scheduled to receive the frames. A transmission terminal may transmit frames within the PSMP-DLT without performing CCA (clear channel assessment) and regardless of NAV (network allocation vector) at the start of its PSMP-DLT.

The terminal should complete data transmission within the allocated PSMP-DLT, even if it has more data queued than can be transmitted during its allocated PSMP-DLT.

A reception terminal receives frames during its scheduled PSMP-DLT, and is not required to receive frames at other PSMP-DLTs while the reception terminal measures channel status information and reports the measured statistics at other PSMP-DLTs in response to a request of channel status measurement.

Figure 11:
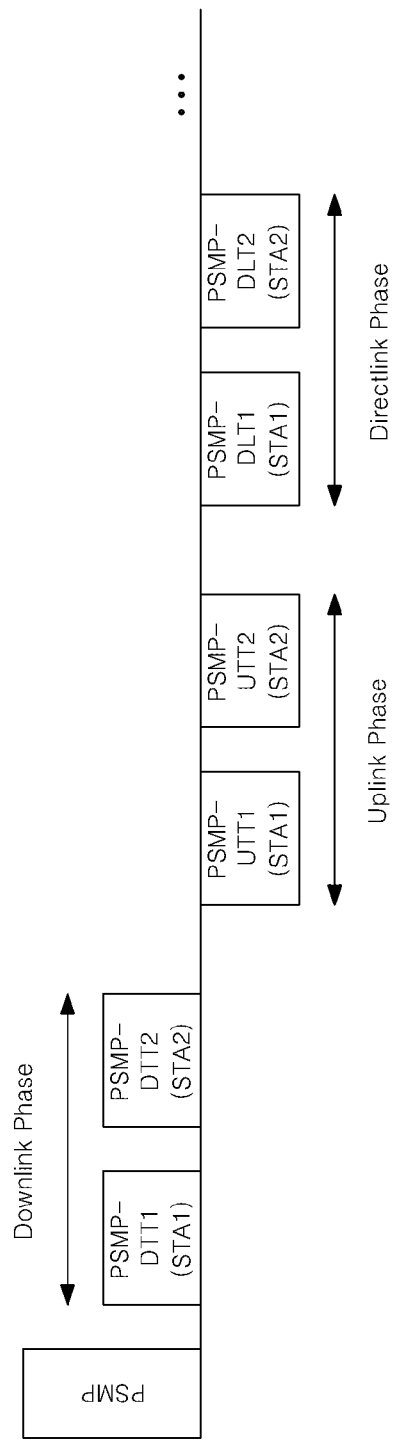
FIG. 11 is a drawing illustrating an operation when a scheduling method according to an exemplary embodiment of the present invention is applied to a PSMP operation of WLAN in more detail.

FIG. 11 is a drawing illustrating an operation when a scheduling method according to an exemplary embodiment of the present invention is applied to a PSMP operation of WLAN in more detail.

In FIG. 11, resources that relate to a time period when downlink communication is possible (downlink phase), a time period when uplink communication is possible (uplink phase), and a time period when direct communication is possible (directlink phase) are allocated to a first terminal STA1. The resources allocated to the first terminal STA1 have the same time periods as those allocated to a second terminal STA2.

Resource allocation for downlink communication is performed through a PSMP-DTT (PSMP-DTT1 and PSMP-DTT2 in FIG. 10), resource allocation for uplink communication is performed through a PSMP-UTT (PSMP-UTT1 and PSMP-UTT2 in FIG. 10) message, and resource allocation for direct communication is performed through a PSMP-DLT (PSMP-DLT1 and PSMP-DLT2 in FIG. 10) message.

The first terminal and the second terminal performs downlink transmission of data, uplink transmission of data, and data transmission through direct communication in the same time periods, respectively.

Figure 12:
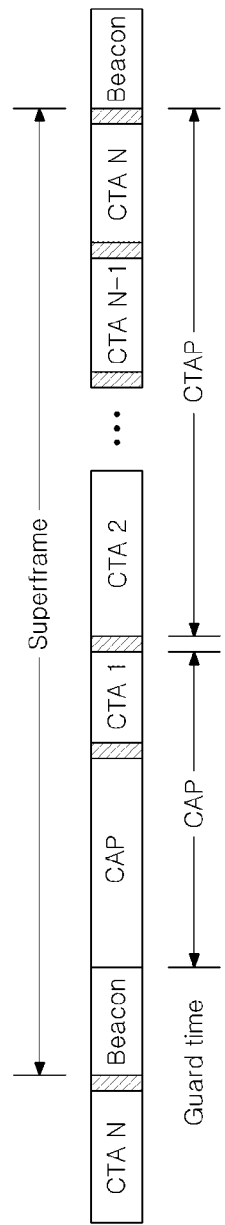
FIG. 12 is a drawing illustrating an example of a frame structure for resource allocation.

FIG. 12 is a drawing illustrating an example of a frame structure for resource allocation.

Specifically, FIG. 12 shows an example of a structure of a super frame in a system in which resource allocation to channels is performed at super frame units.

As shown in FIG. 12, the time period of the super frame may be divided into a beacon transmission period, a contention area period (CAP), and a channel time allocation period (CTAP).

The super frame starts with beacon transmission and a beacon includes information on the structure of the super frame. The CAP is a period when terminals transmit data in a competitive method based on CSMA/CA (carrier sense multiple access with collision avoidance). The CTAP is a period when terminals transmit data in time periods allocated by polling or scheduling in a noncompetitive method. In order to prevent neighboring super frames from overlapping, a guide time exists between the super frames.

FIG. 12 shows just an example of a structure of a frame for allocating resources to terminals. The scheduling method using spatial reuse according to the exemplary embodiment of the present invention can be applied to any frame structures for scheduling transmission periods.

Specific Exemplary Embodiment of Scheduling Method

Hereinafter, the stage of collecting the channel measurement information, the stage of generating the scheduling information, and the data transmission stage described above will be described by using a detailed example.

FIG. 13 to FIG. 16 are signal flow charts illustrating a stage of collecting channel measurement information and a stage of generating scheduling information. In FIG. 13 to FIG. 16, CTA-S, CTA-D, CTA-R, and CTA-T indicate different terminals.

Figure 13:
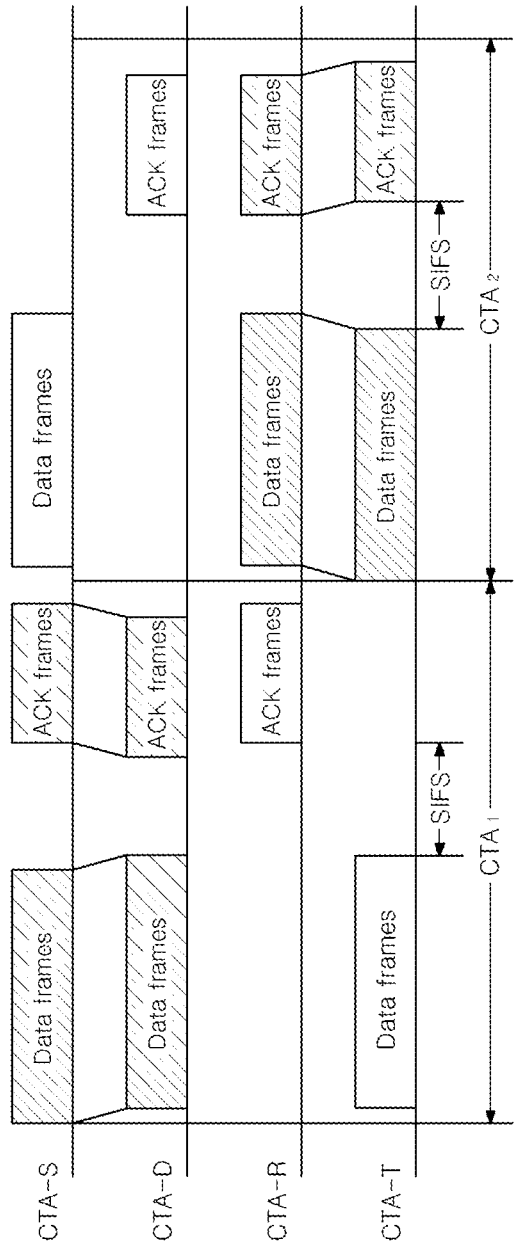
FIG. 13 to FIG. 16 are signal flow charts illustrating a stage of collecting channel measurement information and a stage of generating scheduling information.

First, in FIG. 13, during first channel time allocation $CTA_1$, the CTA-S transmits data frames to the CTA-D and the CTA-D transmits ACK frames to the CTA-S in response thereto. Meanwhile, the CTA-R monitors the ACK frames and the CTA-T monitors the data frames, thereby collecting channel measurement information. Here, it is assumed that the channel statuses measured by the CTA-T and the CTA-R are 'decode' statuses. Accordingly, the CTA-T can receive the data frames with no errors while the CTA-S performs data transmission, and the CTA-D can receive the ACK frame with no errors while the CTA-D transmits the ACK frames.

The CTA-T and the CTA-R transmit channel measurement information, which represents that the 'by src' and the 'by dest' are the 'decode' status and the 'decode' status, to the control station. The control station may generate scheduling information for realizing spatial reuse shown in FIG. 15 with reference to the channel measurement information.

Figure 14:
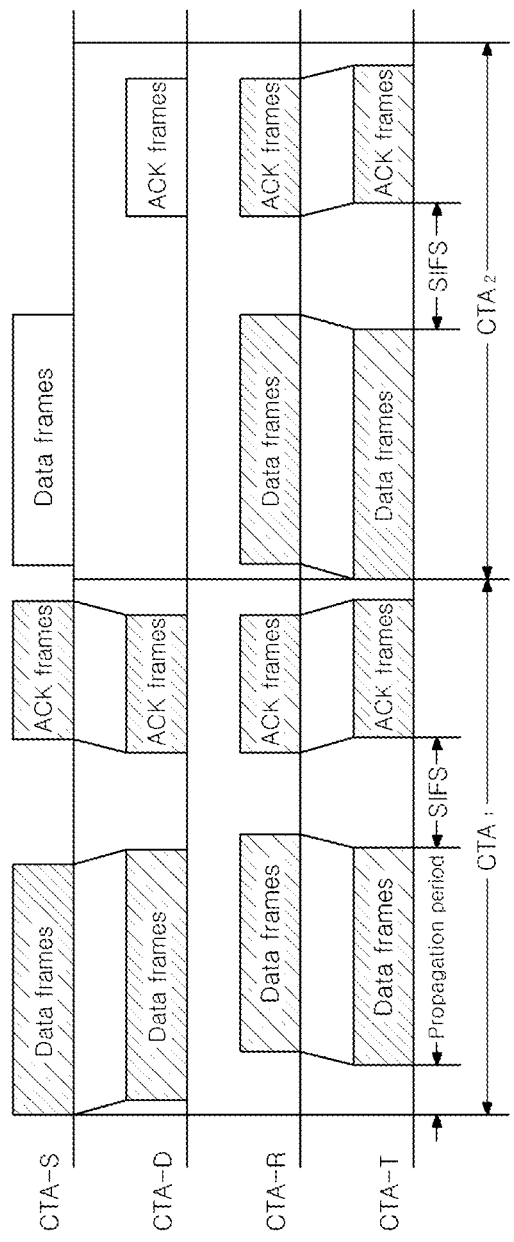

In the example of FIG. 14, the terminal pair composed of the CTA-S and the CTA-D and the terminal pair composed of the CTA-R and the CTA-T having received the scheduling information of the control station start data frame transmission during the first channel time allocation $CTA_1$. Specifically, the CTA-T receives a PLOP header or a MAC header included in the scheduling information during a propagation period to confirm start of data frame transmission of the CTA-S and to check the time period that does not interrupt the data frame reception of the CTA-D. Therefore, in the example of FIG. 15, even if the CTA-T transmits the data frames to the CTA-R when the CTA-S transmits the data frames to the CTA-D, interference therebetween does not occur.

Figure 15:
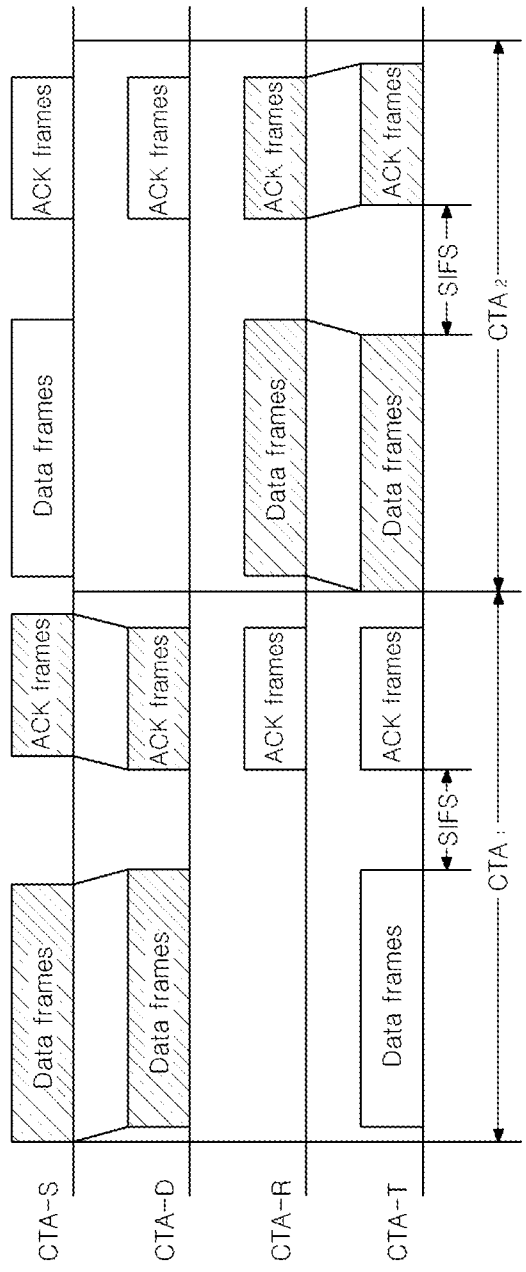

Next, in FIG. 15, during the first channel time allocation $CTA_1$, the CTA-S transmits the data frames to the CTA-D and the CTA-D transmits the ACK frames to the CTA-S in response thereto. Meanwhile, the CTA-R monitors the ACK frames and the CTA-T monitors the ACK frames and the data frames together, thereby collecting the channel measurement information. Accordingly, both of the CTA-R and the CTA-T can receive the ACK frames when the CTA-D transmits the ACK frames, which means interference may occur with respect to the ACK frames. The control station may generate scheduling information for realizing spatial reuse shown in FIG. 16 with reference to the channel measurement information.

Figure 16:
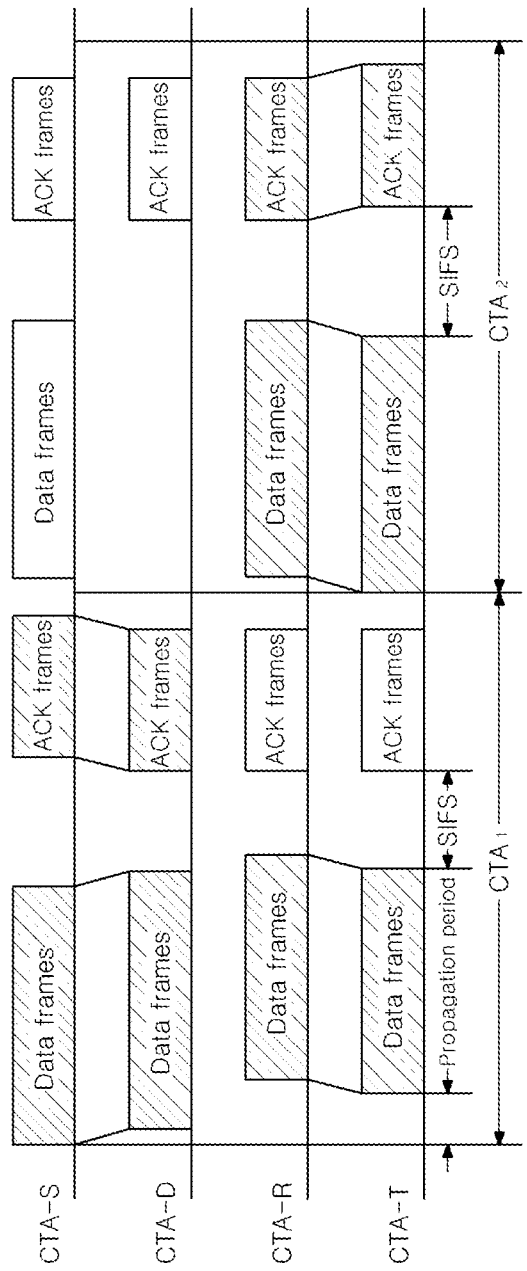

In FIG. 16, the terminal pair composed of the CTA-S and the CTA-D and the terminal pair composed of the CTA-R and the CTA-T having received the scheduling information of the control station start data frame transmission during the first channel time allocation $CTA_1$. Specifically, the CTA-T receives a PLCP header or a MAC header included in the scheduling information during a propagation period to confirm start of data frame transmission of the CTA-S and to check the time period that does not interrupt the data frame reception of the CTA-D. However, since interference may occur with respect to the ACK frames, the CTA-T should transmit only data frames without requiring reception of ACK frames. At this point, the examples of FIG. 15 and FIG. 16 relate to a method of generating scheduling information for realizing limited spatial reuse.

Such limited spatial reuse is useful in the following cases. That is, if a terminal requests data transmission in a period that is not allocated, on the basis of channel measurement information transmitted from the corresponding request terminal, the control station determines whether a reception terminal is able to receive data with no errors. If it is determined that the reception terminal is able to receive data with no errors, the control station additionally allows the request terminal to perform data transmission in a time period allocated in advance. Such a scheduling method may be repeatedly performed until any more additional data transmission is not allowed in the time period allocated in advance.

Improvement in Efficiency of Spatial Reuse

It is possible to improve the efficiency of spatial reuse by restricting frame transmission from a destination to a source in an existing resource allocation period and allocating a new resource to overlap the existing resource allocation period.

Figure 17:
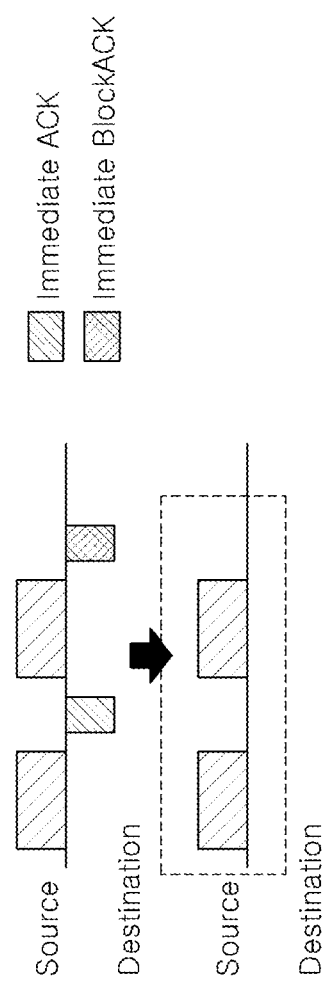
FIG. 17 is a drawing illustrating an example of a scheduling method for improving the efficiency of spatial reuse.

FIG. 17 is a drawing illustrating an example of a scheduling method for improving the efficiency of spatial reuse.

In FIG. 17, the destination may transmit immediate ACK frames, immediate BlockACK frames, or other frames to the source. Here, when the control station ties to allocate a new resource for a new terminal pair to overlap a resource allocated to an existing terminal pair, if frames transmitted by a destination of the existing terminal pair interfere with frame transmission of the new terminal pair, the control station may restrict the frame transmission of the destination of the existing terminal pair and allocate the service period for the new terminal pair. In contrast, if frames transmitted by a destination of the new terminal pair interfere with the frame transmission of the existing terminal pair, the control station may restrict the frame transmission of the destination of the new terminal pair.

Figure 18:
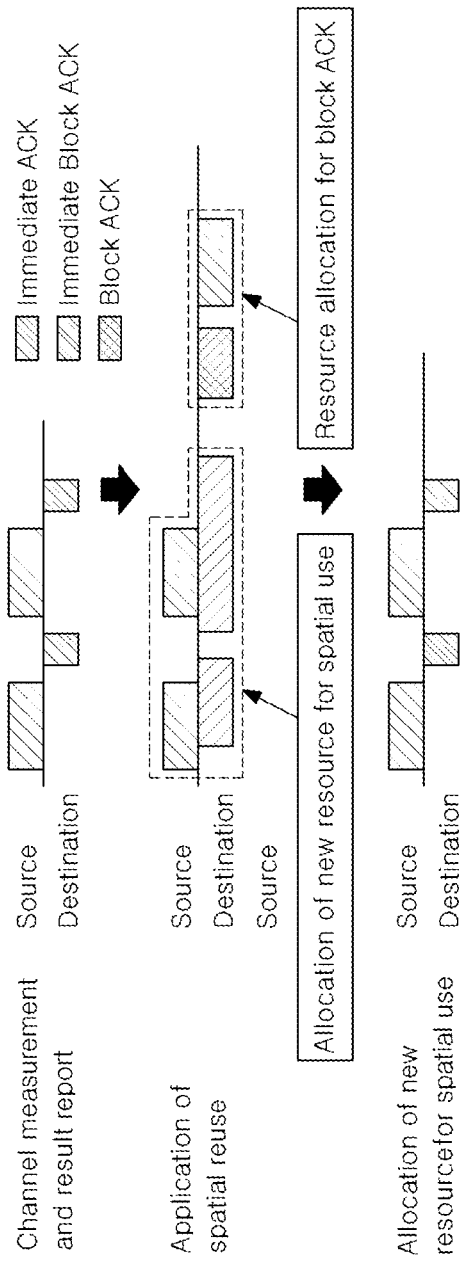
FIG. 18 is a drawing illustrating the scheduling method of FIG. 17 in phases.

FIG. 18 is a drawing illustrating the scheduling method of FIG. 17 in phases.

If determining that the frame transmission of the destination interferes with the frame transmission of the new terminal pair on the basis of the channel measurement information, the control station restricts the frame transmission of the destination and allocates the service period for the new terminal pair. For example, when the existing terminal pair is transmitting frames on the basis of immediate ACK frames or immediate BlockACK frames, transmission of the immediate ACK frames or the immediate BlockACK frames is prohibited. Instead, in order for ACK, a new resource may be additionally allocated, and in order to use the additional resource, the immediate ACK policy may be switched to a block ACK policy.

Meanwhile, when the newly added resource is released such that only resources for the existing terminal pair is allocated, in order to use the newly added resource, a block ACK operation may not end. In this case, the immediate ACK policy and the block ACK policy may be temporarily used together.

FIG. 19 is a drawing illustrating an example of a field structure of scheduling information used in the scheduling method of FIG. 17 and FIG. 18.

In FIG. 19, a TID (traffic ID) field represents an indenfication number for identifying traffic, and as SPType (service period type) field represents the type of an allocated service period. A source AID field and a destination AID field represent an identification number of a source terminal and an identification number of a destination terminal, respectively, and an SP duration field represents the time length of an allocated resource.

A reverse direction field represents whether a destination can transmits frames including immediate ACK frames to a resource within an allocated resource. If it is perceived through the reverse direction field that the destination cannot transmit frames to the source within the corresponding allocated resource, the source and the destination may switch the current ACK policy to a predetermined ACK policy. Here, the predetermined ACK policy may be any kind of ACK policy including a No ACK policy. The destination may transmit information for switching the ACK policy to the resource by using other resources allowing frame transmission.

FIG. 20 is a drawing illustrating the structure of information used to determine the characteristics of traffic for frame transmission.

In FIG. 20, a traffic type field represents the type of traffic and a TSID (traffic stream ID) field represents the dentifier of a traffic stream.

A pseudo-static field represents that resource allocation information is not transmitted through frames, which may include beacons or resource allocation information corresponding thereto, every time, and even through the resource allocation information is not transmitted, the resource allocation information does not change.

A truncate field represents that if there is an extra allocated resource, the allocated resource may be returned, and an extendable field represents that if allocated resources are insufficient, resource allocation may be extended. A beam-forming training field represents that training for beamforming is possible. An UP (user priority) field represents the priority of traffic that is information to allocate a priority to a user in a competitive channel access scheme.

A dynamic ACK policy field represents that when data transmission of the destination is prohibited for spatial reuse, switching of the ACK policy is possible.

Hardware Configuration of Control Station

Figure 21:
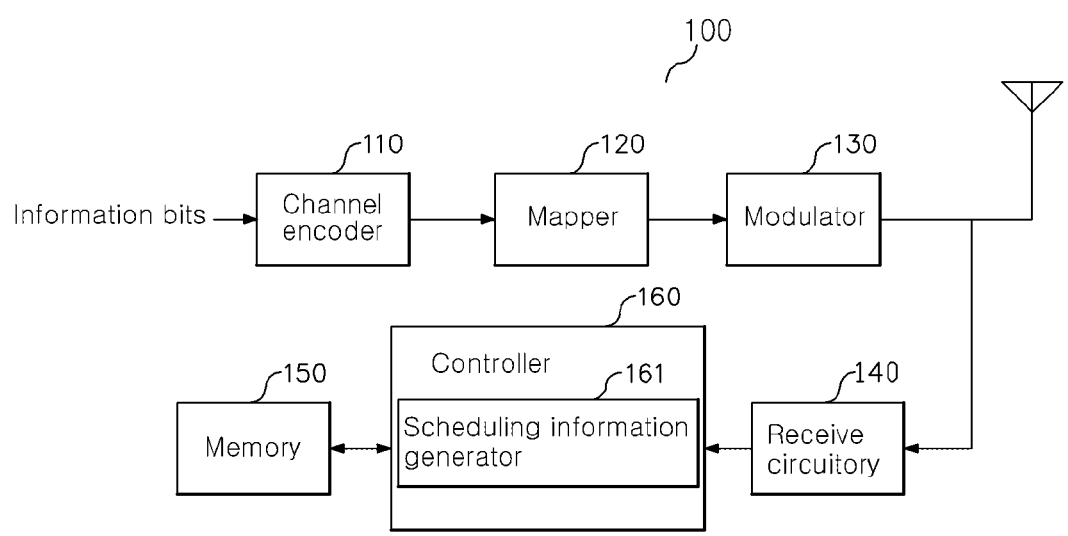
FIG. 21 is a drawing illustrating a configuration of a control station 100 according to an exemplary embodiment of the present invention.

FIG. 21 is a drawing illustrating a configuration of a control station 100 according to an exemplary embodiment of the present invention.

In FIG. 21, the control station 100 includes a channel encoder 110, a mapper 120, a modulator 130, a reception circuitry 140, a memory 150, and a controller 160.

The channel encoder 110 encodes streams of input information bits by a predetermined coding scheme so as to generate coded data.

The mapper 120 maps the coded data output from the channel encoder 110 to symbols represented as positions according to constellations of phases and amplitudes. A modulation scheme is not limited and may be an m-PSK (m-quadrature phase shift keying) or m-QAM (m-quadrature amplitude modulation).

The modulator 130 modulates the mapped transmission symbols according to a multiple access modulation scheme. The multiple access modulation scheme is not limited and may be a single-carrier modulation scheme such as CDMA, or a multi-carrier modulation scheme such as OFDM.

The reception circuitry 140 receives a reception signal through an antenna, digitizes the signal, and transmits the digital signal to the controller 160.

The memory 150 stores various kinds of system information necessary for the operation of the control station 100, scheduling information, and channel measurement information received from terminals.

The controller 160 controls the general operation of the control station 100 and particularly includes a scheduling information generating unit 161.

The scheduling information generating unit 161 generates first scheduling information to define transmission/reception terminals and transmission time periods, or generates second scheduling information to define transmission time periods and a plurality of transmission/reception terminals that do not interfere with each other by using channel measurement information received by the reception circuitry 140. Next, the generated first scheduling information and second scheduling information are transmited to the terminals in the network. A procedure of generating the second scheduling information by using channel measurement information is the same as described above.

Hardware Configuration of Terminal

Figure 22:
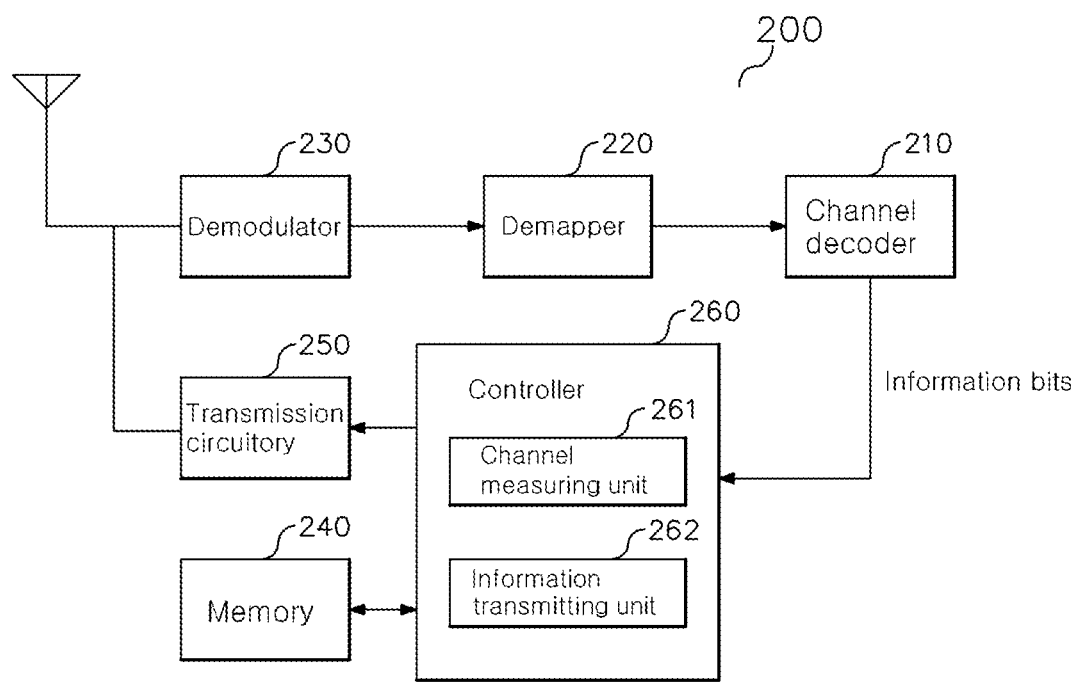
FIG. 22 is a drawing illustrating a configuration of a terminal according to an exemplary embodiment of the present invention.

FIG. 22 is a drawing illustrating a configuration of a terminal 200 according to an exemplary embodiment of the present invention.

In FIG. 22, the terminal 200 includes a channel decoder 210, a demapper 220, a demodulator 230, a memory 240, a transmission circuitry 250, and a controller 260.

The demodulator 230, the demapper 220, and the channel decoder 210 of the terminal 200 perform inverse functions to the modulator 130, the mapper 120, and the channel encoder 110 of the control station 100. In other words, a signal received through an antenna is demodulated by the demodulator 230, and is demapped to the coded data by the demapper 220. Next, the coded data is decoded by the channel decoder 210. The demodulator 230, the demapper 220, and the channel decoder 210 may be generally called a reception circuitry (not shown).

The memory 240 stores various kinds of system information necessary for the operation of the terminal 200, channel measurement information generated by the terminal 200, and scheduling information received from the control station 100.

The transmission circuitry 250 receives various kinds of data from controller 260, performs D/A conversion on the data, and transmits the data to the control station 100 through the antenna.

The controller 260 controls the general operation of the terminal 200 and particularly includes a channel measuring unit 261 and an information transmitting unit 262.

When the terminal 200 is not defined as a transmission terminal or a reception terminal in the scheduling information received form the control station, the channel measuring unit 261 performs transmission channel measurement on the transmission terminal and the reception terminal. The detailed operation of the channel measuring unit 261 is the same as described in detail in regard to the above-mentioned scheduling method.

The information transmitting unit 262 transmits channel measurement information according to the measurement results to the control station. When the terminal 200 is defined as a transmission terminal or a reception terminal in the scheduling information, the information transmitting unit 262 performs data transmission or ACK message transmission in a transmission time period defined in the scheduling information. The detailed operation of the information transmitting unit 262 such as data transmission or ACK message transmission in a time period allocated in the scheduling information is also the same as described in detail in regard to the above-mentioned scheduling method.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A scheduling method of a control station for spatial reuse comprising:

transmitting first scheduling information requesting at least one terminal in a network to perform channel measurement;

receiving channel measurement information for spatial reuse from the terminals in the network; and generating second scheduling information allocating a new resource to overlap an existing resource allocation area to at least one terminal pair that do not interfere with each other by using the channel measurement information, wherein the generating of the second scheduling information includes if it is determined as the analyzed result of the channel measurement information that ACK message transmission of a reception terminal interrupts data transmission of a new terminal pair, generating the second scheduling information informing that the ACK message transmission of the reception terminal is restricted.

2. The scheduling method for spatial reuse of claim 1, wherein:

the channel measurement information includes the channel status of transmitting/receiving terminals defined in the first scheduling information.

3. The scheduling method for spatial reuse of claim 2, wherein: the channel status includes at least one of a decode status representing that a monitoring terminal can receive data of the transmission terminal through a monitored channel with no errors, an idle status representing that the monitored channel is idle, a busy status representing that, while the monitored channel is busy, it is not clear whether the data of the transmission terminal is received with no errors, and an unknown status representing that, while the monitored channel is busy, it is not clear whether the transmission terminal is using the monitored channel or the reception terminal is using the monitored channel.

4. The scheduling method for spatial reuse of claim 3, wherein: the receiving the channel measurement information includes:

allowing a transmission terminal to transmit data to a reception terminal according to the first scheduling information;

allowing the reception terminal to transmit an ACK message for informing successive reception to the transmission terminal;

allowing a first monitoring terminal to measure a transmission channel of the transmission terminal;

allowing a second monitoring terminal to measure a transmission channel of the reception terminal; and allowing the first monitoring terminal and the second monitoring terminal to report the measurement results to the control station.

5. The scheduling method for spatial reuse of claim 4, wherein:

when the measurement result of the first monitoring terminal represents is the decode status representing that the data transmission of the transmission terminal can be monitored and the measurement result of the second monitoring terminal is the decode status representing that the ACK message transmission of the reception terminal can be monitored, the control station generates the second scheduling information for allocating a transmission time period to the pair of the first monitoring terminal and the second monitoring terminal.

6. The scheduling method for spatial reuse of claim 5, wherein:

in the transmission time period allocated by the second scheduling information, if the first monitoring terminal transmits data to the second monitoring terminal, the second monitoring terminal transmits an ACK message to the first monitoring terminal.

7. The scheduling method for spatial reuse of claim 4, wherein:

when the measurement result of the first monitoring terminal represents is the decode status with respect to the data transmission of the transmission terminal and the busy status with respect to the ACK message transmission of the reception terminal, and the measurement result of the second monitoring terminal is the busy status with respect to the ACK message transmission of the reception terminal, the control station generates the second scheduling information for allocating a transmission time period to the pair of the first monitoring terminal and the second monitoring terminal.

8. The scheduling method for spatial reuse of claim 7, wherein:

in the transmission time period allocated by the second scheduling information, the first monitoring terminal transmits data that does not require reception of an ACK message.

9. The scheduling method for spatial reuse of claim 1, wherein:

the channel measurement information includes information on a signal level of the transmission channel.

10. The scheduling method for spatial reuse of claim 9, wherein:

when the signal level of the transmission channel is lower than a predetermined reference value, the control station generates the second scheduling information for allocating a transmission time period to a terminal having transmitted corresponding channel measurement information.

11. The scheduling method for spatial reuse of claim 1, wherein:

the control station receives the channel measurement information from a terminal trying to obtain a chance for data transmission by the second scheduling information.

12. The scheduling method for spatial reuse of claim 1, wherein:

the control station transmits the first scheduling information to the terminals in the network, the first scheduling information defining a first terminal to transmit test data in the transmission time period and a second terminal to measure a transmission channel to transmit the test data, and receives the channel measurement information from the second terminal.

13. The scheduling method for spatial reuse of claim 1, wherein: the second scheduling information includes at least one of start of the transmission time period, duration of the transmission time period, the identifier of the transmission terminal, the identifier of the reception terminal, a reason code of transmission time period allocation, and the identifier of the transmission time period when channel measurement is performed.

14. The scheduling method for spatial reuse of claim 13, wherein: the reason code includes at least one of a first code corresponding to frame transmission, a second code corresponding to measurement of pilot frame transmission, a third code corresponding to report of channel measurement information, and a fourth code corresponding to frame transmission by the second scheduling information.

15. The scheduling method for spatial reuse of claim 1, further comprising:

if it is determined as the analyzed result of the channel measurement information that ACK message transmission of a reception terminal interrupts data transmission of a new terminal pair, switching a current ACK message transmission policy to another predetermined ACK message transmission policy.

16. The scheduling method for spatial reuse of claim 15, wherein:

the current ACK message transmission scheme is an immediate ACK policy, and the another predetermined ACK message transmission scheme is a block ACK policy.

17. The scheduling method for spatial reuse of claim 1, wherein existing resource allocation area is a time period.

18. A terminal device that supports scheduling for spatial reuse, comprising:

a channel measuring unit configured to measure a transmission channel of a transmission terminal and a reception terminal when the terminal device is not defined as the transmission terminal or the reception terminal in scheduling information received from a control station;

an information transmitting unit configured to transmit channel measurement information according to the measurement results to the control station, and to perform data transmission or ACK message transmission in a transmission time period defined in the scheduling information when the terminal device is defined as the transmission terminal or the reception terminal in the scheduling information; and wherein the information transmitting unit is further configured to switch a current ACK message transmission policy to another predetermined ACK message transmission policy when the scheduling information includes information representing that ACK message transmission of the terminal device is restricted.

19. The terminal device that supports scheduling for spatial reuse of claim 18, wherein: the channel measurement information includes a channel status of the transmission terminal or the reception terminal defined in the scheduling information.

20. The terminal device that supports scheduling for spatial reuse of claim 19, wherein: the channel status includes at least one of a decode status representing that a monitoring terminal can receive data of the transmission terminal through a monitored channel with no errors, an idle status representing that the monitored channel is idle, a busy status representing that, while the monitored channel is busy, it is not clear whether the data of the transmission terminal is received with no errors, and an unknown status representing that, while the monitored channel is busy, it is not clear whether the transmission terminal is using the monitored channel or the reception terminal is using the monitored channel.

21. The terminal device that supports scheduling for spatial reuse of claim 20, wherein: the channel measuring unit measures a corresponding transmission channel when the transmission terminal transmits data to the reception terminal according to the scheduling information, and measures a corresponding transmission channel when the reception terminal transmits an ACK message informing successive reception to the transmission terminal.

22. The terminal device that supports scheduling for spatial reuse of claim 18, wherein:

the channel measurement information includes information on a signal level of the transmission channel.

23. The terminal device that supports scheduling for spatial reuse of claim 18, wherein: the scheduling information includes at least one of start of the transmission time period, duration of the transmission time period, the identifier of the transmission terminal, the identifier of the reception terminal, a reason code of transmission time period allocation, and the identifier of the transmission time period when channel measurement is performed.

24. The terminal device that supports scheduling for spatial reuse of claim 23, wherein: the reason code includes at least one of a first code corresponding to frame transmission, a second code corresponding to measurement of pilot frame transmission, a third code corresponding to report of channel measurement information, and a fourth code corresponding to frame transmission by the second scheduling information.

25. The terminal device that supports scheduling for spatial reuse of claim 18, wherein:

the current ACK message transmission scheme is an immediate ACK policy, and the another predetermined ACK message transmission scheme is a block ACK policy.

* * * * *